United States Patent

Hagel

[11] Patent Number: 5,241,842
[45] Date of Patent: Sep. 7, 1993

[54] WARP KNITTING MACHINE WITH INDIVIDUALLY MOVABLE YARN GUIDES ARRANGED ON A GUIDE BAR

[75] Inventor: Adolf Hagel, Bad Steben, Fed. Rep. of Germany

[73] Assignee: LIBA Maschinenfabrik GmbH, Naila, Fed. Rep. of Germany

[21] Appl. No.: 871,944

[22] Filed: Apr. 22, 1992

[30] Foreign Application Priority Data

Apr. 29, 1991 [DE] Fed. Rep. of Germany ....... 4114012

[51] Int. Cl.⁵ .............................................. D04B 27/32
[52] U.S. Cl. ........................................ 66/204; 66/207
[58] Field of Search ................. 66/204, 205, 206, 207, 66/208, 203

[56] References Cited

U.S. PATENT DOCUMENTS

| | | | |
|---|---|---|---|
| 3,754,415 | 8/1973 | Kohl | 66/204 |
| 3,978,690 | 9/1976 | Beling et al. | 66/205 |
| 4,570,462 | 2/1986 | Roth | 66/204 |

FOREIGN PATENT DOCUMENTS

| | | |
|---|---|---|
| 277378 | 8/1924 | Fed. Rep. of Germany . |
| 2035750 | 1/1972 | Fed. Rep. of Germany ........ 66/207 |
| 2601899 | 9/1976 | Fed. Rep. of Germany . |
| 2706974 | 11/1979 | Fed. Rep. of Germany . |
| 3023952 | 1/1982 | Fed. Rep. of Germany ........ 66/207 |
| 3130555 | 2/1983 | Fed. Rep. of Germany ........ 66/207 |
| 3321733 | 12/1984 | Fed. Rep. of Germany ........ 66/204 |
| 3642523 | 9/1987 | Fed. Rep. of Germany ........ 66/207 |
| 3800381 | 7/1989 | Fed. Rep. of Germany . |

Primary Examiner—Clifford D. Crowder
Assistant Examiner—Larry D. Worrell, Jr.
Attorney, Agent, or Firm—Bell, Seltzer, Park & Gibson

[57] ABSTRACT

A warp knitting machine comprising at least one guide bar on which individual yarn guides are arranged for individual reciprocating movement in the racking direction, the yarn guides being combined to one or several groups and moved in groups by a common pattern drive. The pattern drives are designed as servomotors which are electrically controlled by a program control and supported independently of the guide bar, and which are connected with the yarn guides via traction control cables maintained under tension.

8 Claims, 3 Drawing Sheets

WARP KNITTING MACHINE WITH INDIVIDUALLY MOVABLE YARN GUIDES ARRANGED ON A GUIDE BAR

The invention relates to a warp knitting machine having at least one guide bar on which individual yarn guides are arranged for individual reciprocating movement in the racking direction, with the yarn guides being combined to one or several groups and moved in groups respectively by a common pattern drive.

Such a warp knitting machine is known from German Patent 27 06 974. Such a warp knitting machine enables the patterning of warp knits which is limited, though, in comparison with the unlimited patterning possibility by means of a jacquard control, since not all yarn guides are individually movable. However, the collective movement of the yarn guides of one group, which is effected by a common pattern drive, suffices for a large number of desired patterns. The combination of the yarn guides to groups with a common pattern drive for the group results in a substantial increase of the operating speed of the respective warp knitting machine in comparison with such a machine with a jacquard control system and, thus, in considerable savings of costs.

With respect to the drive of the yarn guides, the foregoing publication discloses only that within a group of yarn guides, the latter are moved back and forth by common push rods to which the yarn guides constructed as two-arm levers are jointed individually. As regards the drive for the push rods, the publication does not contain any specific indications. One can note only from German Patent 277 378 and German Disclosed Application DE-OS 26 01 899, which are cited in aforesaid publication, that push rods are moved back and forth by a jacquard control system or respectively the links of a pattern chain.

A collective movement of individual yarn guides is further described in German Disclosed Application DE-OS 38 00 381. In this known configuration of a warp knitting machine, the pattern drives are arranged together with the individually reciprocating yarn guides on the respective guide bars, i.e., the mass of each guide bar is enlarged by the pattern drive, which opposes a corresponding resistance of inertia to a desirable, rapid movement of the guide bar in the meaning of a high efficiency of the warp knitting machine.

It is the object of the present invention to further increase the operating speed of the initially described warp knitting machine with little space requirement and a quick adaptation to the pattern changes. In accordance with the invention, this is accomplished in that the pattern drives are designed and constructed as servomotors which are electrically controlled by a program control and supported independently of the guide bar, and which are connected with the yarn guides via traction control cables maintained under tension.

The use of the traction control cables connected with the yarn guides results on the one hand in a low mass inertia for this portion of the yarn guide drive and on the other hand in little space requirements, with the traction control cables enabling any desired deflections because of their inherent flexibility and, thus, an adaptation of the position of the electric servomotors to the constructional conditions of a warp knitting machine The low mass inertia permits to correspondingly increase the operating speed of the respective warp knitting machine. In so doing, the use of the electric servomotors pulling the traction control cables back and forth allows a rapid adjustment of the respective warp knitting machine to changing patterns, since such servomotors are in a position to process in known manner the signals received from a control circuit at a high speed, it being possible to switch the control easily and rapidly over to different patterns.

The small space requirements in connection with the low construction cost and adaptability to space of the entire arrangement of traction control cables and electric servomotors makes it possible to retrofit multi-guide bar warp knitting machines, in which at least one guide bar needs to be equipped wit individually movable yarn guides combined to groups. If need arises, it will be possible to carry out this adaptation by exchanging one or several guide bars.

The warp knitting machine designed and constructed in accordance with the invention permits to equip either only one or also several guide bars with the individually movable yarn guides combined to groups, which results in a corresponding range of variation with respect to the patterning possibility. Since the guide bars constructed in accordance with the invention are now made especially space-saving as regards the drive of the movable yarn guides, and adaptable as regards the entire arrangement, it is possible, if need arises, to exchange a guide bar of the present invention for a standard, fully equipped guide bar, and vice versa, thus permitting the operation of the respective warp knitting machine to be adapted in a simple manner to the most different situations of need.

The traction control cables can be kept under tension in that they are attached to tension springs on their side facing away from the servomotors. However, it is also possible to guide the traction control cables from the servomotor to the yarn guides (forward run) and from the latter via a deflection means to the servomotors (return run), with the servomotors effecting the forward and the backward movement respectively in the same length. In the latter configuration, it is not necessary that the servomotors overcome the force of a tension spring, so that they can be moved correspondingly faster. Thus, also servomotors with a low output will do.

In the case the traction control cables are designed for forward and return movement, it is possible to connect individual yarns guides with the forward run and the other yarns guide with the return run of the traction control cables. In this event, it is possible to obtain a mirror-image pattern in a simple manner.

To avoid that the movement of the traction control cables is influenced as a result of the swing movement of the guide bars and, possibly, their racking movement, it is useful to guide the traction control cables such that they are deflected toward the pattern drive at approximately a right angle to the racking direction of the guide bar, with the deflected range of the traction control cables extending beside the front end of the axis of the guide bar rocker shaft and substantially intersecting the vanishing line of this axis. The special movements of the guide bar will then practically be unable to become effective on the traction control cables.

To thread the yarns to knit into the yarn guides, it is common practice to disengage the guide bars from their normal mounting support and to engage them spaced apart from the other bars, so as to make the disengaged guide bar easily accessible for threading the yarns. This can be facilitated, taking account of the presence of the traction control cables, in that a deflection means for the traction control cables precedes each of the servomotors, and that the mounting support of the deflection means is detachable for the release of the traction control cables. To disengage the respective guide bar, the traction control cables are released and allowed to sag at once, thus freeing the respective guide bar for engaging it in an accessible position. Advantageously, the releasable mounting support is provided with a tensioning device for the respective traction control cable, so that the same structural component makes it possible to both release the traction control cables and provide for their necessary tension.

To make the configuration of the drives for the individually movable yarn guides in accordance with the invention also usable in warp knitting machines of a particularly fine gauge, it will be useful to design the drive such that the connection of traction control cable and yarn guides includes a spring rod, and that stops are arranged on the guide bar to limit the reciprocating movement of the yarn guides. The stops will allow to then exactly limit the reciprocating movement of the yarn guides without it being necessary to demand from the servomotors a corresponding accuracy of positioning.

Embodiments of the invention are illustrated in the figures of the drawing, in which.

Figure 1:
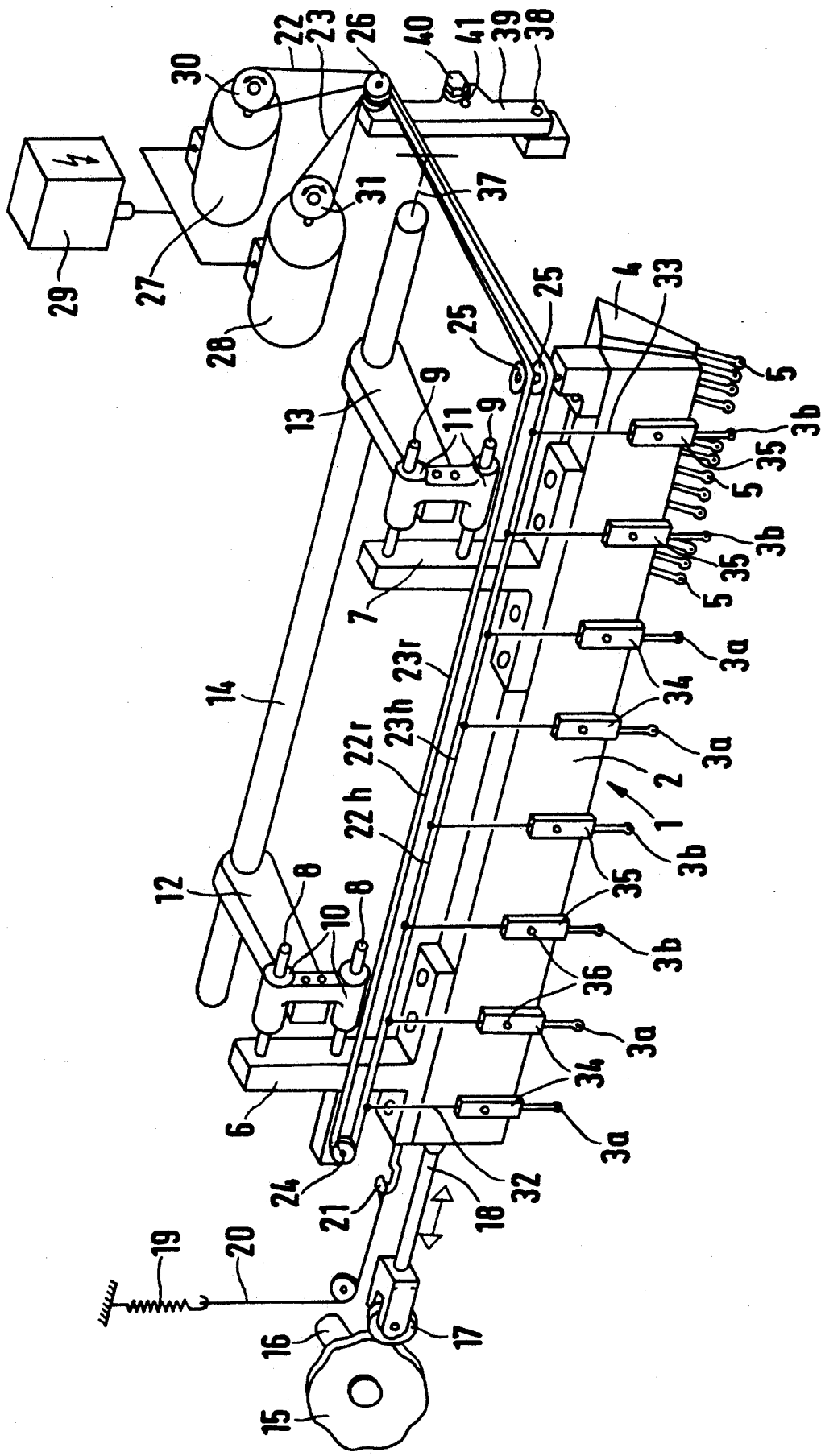
FIG. 1 is a view of the guide bar of a warp knitting machine with a group of yarn guides adapted for forward and backward movement in racking direction, which are laid by circulating traction control cables.

The guide bar 1 of a warp knitting machine as illustrated in FIG. 1 consists here of a support 2 for yarn guides 3 adapted for forward and backward movement in the racking direction and constructed as eye-pointed needles, and a support 4 for yarn guides 5 which are arranged on this bar and likewise constructed as eye-pointed needles. The two supports 2 and 4 are firmly interconnected, so that during a swing motion of the guide bar 1, the yarn guides 3 and 5 swing jointly through the gaps between the knitting needles of the respective warp knitting machine. An illustration of the knitting needles was left out in the configuration of FIG. 1, since the interaction of knitting needles and yarn guides of a warp knitting machine has been a known function since the existence of warp knitting machines. For this reason, further elements of a warp knitting machine, which are not of interest in this context, were also left out.

The guide bar 1 is supported by two carrier arms 6 and 7, from which project guide pins 8 and 9 project, which are held in axial guide bearings 10 and 11. This bearing mount allows movement the guide bar 1 back and forth in its longitudinal direction, which will be explained below in greater detail. The axial guide bearings 10 and 11 are mounted in swing arms 12 and 13 which are carried by and non-rotatably affixed to guide bar rocker shaft 14. The guide bar rocker shaft 14 is moved forward and rearward about its axis in known manner by the drive of the warp knitting machine, thereby imparting to the yarns guides 3 and 5 the aforesaid swing motion for swinging through the needle gaps. Also, this is a known function The guide bar 1 undergoes reciprocatory movement in the so-called racking direction, i.e. in its longitudinal direction, a forward and backward movement which movement is imparted to the guide bar 1 by a cam 15. As the cam 15 rotates about its axis 16, it pushes a follower 17 back and forth, with the latter transmitting its motion in the racking direction to a plunger 18 and, thus, to the guide bar 1. This forward and backward movement in the racking direction is indicated by a double arrow along the plunger 18. To ensure that the follower 17 is always in contact with the cam 15, the guide bar 1 is also pulled via a spring 19, a traction cable 20 and a hook 21 toward cam 15. As a result of the forward and backward movement of the guide bar 1 in the racking direction, the yarn guides 3 and 5 perform their swing action between adjacent needles through respectively different needle gaps, whereby the respectively desired appearance of the knit fabric is obtained. In so doing, the yarn guides 5 perform those inlays which shape substantially the fabric to be produced. Consequently, the yarn guides 5 are arranged over the entire length of the guide bar 1.

As is shown in FIG. 1, gaps are left in the row of yarn guides 5, which are filled by the yarn guides 3. When the yarn guides 3 and 5 are steadily held in their illustrated position, a uniform appearance of the loops in the fabric to be produced, will result over its entire width.

The yarn guides 5 form a group within which all yarn guides 5 can be moved back and forth in the racking direction. During this forward and backward movement, the yarn guides 5 move from a normal position to a patterning position and return therefrom, as will be explained in more detail with reference to FIG. 3. In their normal position, as is shown in FIG. 1, the yarns laid by the yarn guides 3 are laid uniformly between the yarns laid by yarn guides 5, so that the aforesaid uniform appearance of the loops will result.

To work a pattern into the basic fabric substantially knit by the yarn guides 5, the yarn guides 3 are moved from their normal position to a patterning position in the racking direction of guide bar 1. This motion is imparted to the yarn guides 3a and 3b by pattern control means that includes endless traction control cables 22 and 23. In so doing, the segments 22h and 23h serve substantially for the forward movement and the segments 22r and 23r for the backward movement of the respective traction control cable. At the end of guide bar 1 on the side of the cam, the traction control cables 22 and 23 travel over deflection rolls 24. They are then again deflected by rolls 26, with the traction control cable 22 being directed to an electric servomotor 27, and the traction control cable 23 to electric servomotor 28. These electric servomotors 27 and 28 are controlled by a program control 29 which is synchronized with the other movements of the warp knitting machine such that the servomotors 27 and 28 rotate their drive wheels 30 and 31 forward and backward, thereby imparting to the traction control cables 22 and 23 in the region of their forward movement a corresponding reciprocal movement in the racking direction. This reciprocal movement of the forward moving cable segments 22h and 23h is now transmitted to levers 32 and 33 attached thereto, with the latter imparting a corresponding swing motion to yarn guide holders 34 and 35 to which they are attached. To this end, the yarn guide holders 34 and 35 are pivotally mounted on shafts 36 attached to the support. The yarn guides 3a and 3b thus undergo, in response to the reciprocating movement of the forward moving cable segments 22h and 23h, a corresponding reciprocal movement, by which the yarns guides 3a and 3b move from their normal position to the patterning position and return to the former.

Since now the yarns guides 3a are reciprocated by the traction control cable 22, and the yarn guides 3b by the traction control cable 23, the two separately controllable servomotors 27 and 28 make it possible to reciprocate the two groups of yarn guides 3a and 3b in a different manner, thus permitting a corresponding variation in the pattern. When further variations with respect to the patterning are desired, it will be necessary to provide accordingly more servomotors and traction control cables and yarn guides which they control.

The support 4 shown in FIG. 1 with its yarn guides 5 may be supported also independently of support 2 and separately in its own carrier arms 6 and 7 and guide pins 8 and 9 with the pertinent axial bearings 10 and 11. In this instance, it will then be controlled likewise by a separate cam 15 in the racking direction. Because of clarity, this separate mount is not shown in FIG. 1.

The actuation mechanism for the two groups of yarns guides 3a and 3b shown in FIG. 1 consists substantially of the respective traction control cable 22 or 23 and the two servomotors 27 and 28. No great amount of energy for the reciprocal movement of the traction control cables 22 and 23 and the thereby controlled yarn guides 3a and 3b is required from the servomotors 27 and 28, since these elements are relatively light-weight structural parts. This has a corresponding favorable influence on the traverse speed of the guide bar 1 which can accordingly be high.

To influence as little as possible the movably arranged yarn guides 3a and 3b as a result of the above described movement of the guide bar 1 (racking movement and swing movement about the axis 14), the traction control cables 22 and 23 are guided over deflection rolls 25, with the former intersecting the vanishing line 37 of the axis 14 substantially in the region between the deflecting rolls 25 and 26. Thus, when the guide bar performs its racking movement, this guidance of the traction control cables 22 and 23 does practically not result in a length variation between the deflecting rolls 25 and 26, so that the yarn guides 3a and 3b do practically not perform a swing movement about the axes 36 as a result of the racking movement of the guide bar 1. This applies analogously to the swing movement of the guide bar about the axis 14. During this swing movement, the traction control cables 22 and 23 are moved along in the region between the deflecting rolls 25 and 26 without resulting in a length variation of any importance in the region of the traction control cables. This swing movement is effective in the same manner on the forward moving cable segment 22h or 23h and on the returning cable segment 22r or 23r, so that the traction control cables 22 and 23 can by no means be displaced in their longitudinal direction. As aforesaid, a length variation in the region between the deflecting rolls 25 and 26 does practically not occur, so that the two traction control cables 22 and 23 maintain their adjusted tension.

The deflecting rolls 26 are supported at the end of a guide 39 which is rotatably supported on a shaft 38. As the guide 39 is pivoted, the tension in the traction control cables 22 and 23 can be decreased or increased correspondingly. The respectively desired tension can be adjusted in that a fastening screw 40, below which an oblong hole 41 is arranged in the guide 39, is tightened toward the guide 39. Depending on the position of the fastening screw 40 with respect to the elongated hole 41, it is thus possible to adjust the tension of the two traction control cables 22 and 23. To be able to remove the guide bar for the purpose of threading the yarn, the traction control cables 22 and 23 are released in that the guide 39 is pivoted, after loosening the fastening screw 40, in direction of the deflecting rolls 25, thereby releasing the traction control cables 22 and 23 and making it possible to remove the guide bar 1 from its mounting support in known manner.

Figure 2:
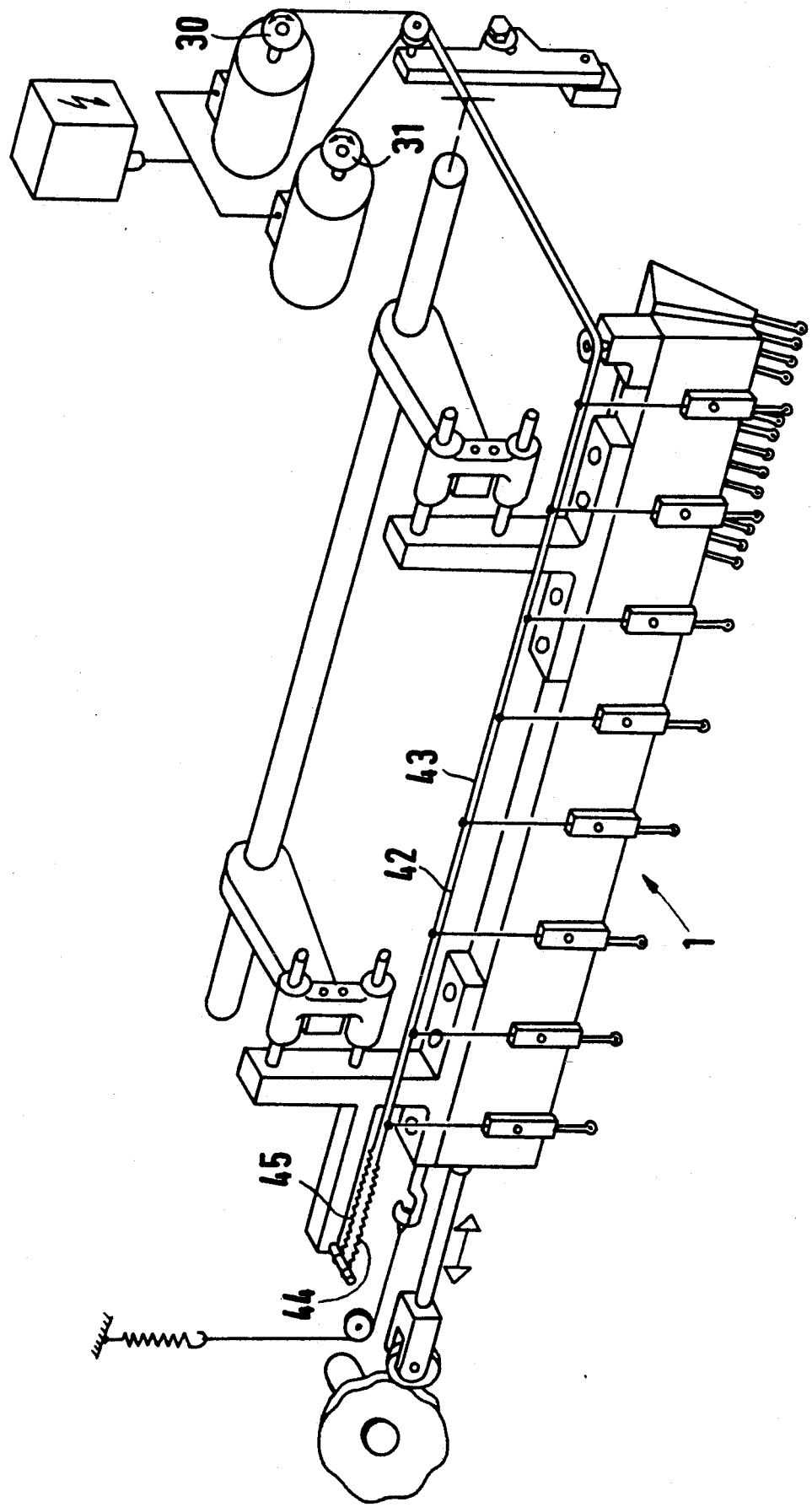
FIG. 2 is a view of a guide bar arranged in the same manner, in which the traction control cables are attached to tension springs.

As regards its support and control, the guide bar 1 shown in FIG. 2 corresponds to that of FIG. 1, so that with respect thereto one may refer to the description of FIG. 1. The arrangement of FIG. 2, merely provides for a different guidance of the two traction control cables 42 and 43. In this instance, the traction control cables are not endless as in FIG. 1. Instead, the traction control cables are tensioned by springs 44 and 45 on their one side and wound and unwound by drive wheels 30 and 31 on their other side. Likewise in this arrangement, the traction control cables 42 and 43 perform a reciprocating movement in the racking direction as the forward moving cable segments 22h and 23h or FIG. 1, thereby moving the yarn guides 3a and 3b back and forth as in the arrangement of FIG. 1. Otherwise, the arrangement of FIG. 2 is entirely identical with that of FIG. 1.

Figure 3:
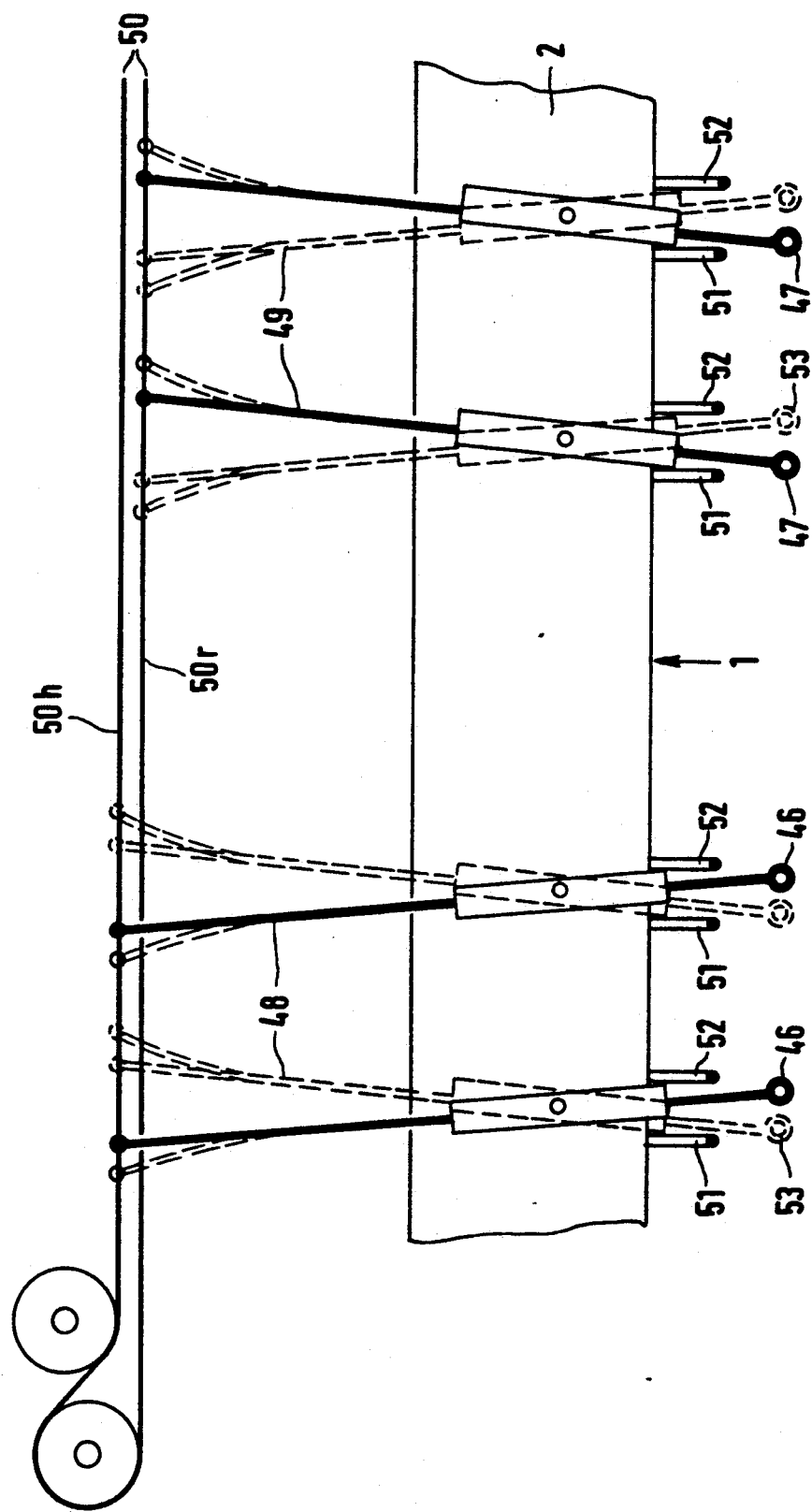
FIG. 3 is a cutout view of a guide bar with a group of yarn guides adapted for forward and backward movement, which are moved via spring bars.

FIG. 3 illustrates only the support 2 of the guide bar 1 with two groups of yarn guides 46 and 47 arranged for reciprocating movement. The yarn guides 46 and 47 are mounted on support 2 as in the arrangements of FIGS. 1 and 2. However, in the arrangement of FIG. 3, the rods 48 and 49 are made of a flexible material. In other words, they are spring bars which are correspondingly deflected as the traction control cable 50 moves back and forth. For the forward and backward movement of the yarn guides 46 and 47, stops 51 and 52 are provided, with the yarn guides 46 and 47 assuming their normal position in the position illustrated in solid lines, whereas their patterning position is shown by dashed lines (numeral 53). As a result of these stops 51 and 52, the yarn guides 46 and 47 receive each a defined end position during the forward and backward movement of the traction control cable 50, so that clear conditions exist with respect to the needle interspaces, through which the yarn guides 46 and 47 are swung. The traction control cable 50 may easily exhibit to a slight extent, and without a close tolerance, a certain excessive stroke which is subsequently absorbed by a corresponding bending of the spring rods 48 and 49. The stiffness of the spring rods 48 and 49 should be selected such that the forces exerted by the yarns on the yarn guides 46 and 47 are fully absorbed by the spring rods 48 and 49, i.e., the yarn guides 46 and 47 are held in their positions defined by the stops 51 and 52 under the tension of the spring rods 48 and 49 at the stops.

Also illustrated in FIG. 3 is a special feature for the patterning, which includes the attachment of the spring rods 48 to the forward moving cable run 50h and the attachment of the spring rods 49 to the returning cable run 50r. This results in a mirror-image patterning of the group with the yarn guides 46 relative to the group with the yarn guides 47, as is desired for many purposes. For this kind of mirror-image patterning, only one servomotor is needed for the movement of the traction control cable 50.

That which is claimed is:

1. A warp knitting machine, comprising:

at least one guide bar mounted for longitudinal racking movement in a racking direction;

individual yarn guides mounted upon said guide bar for reciprocating movement in the racking direction; said yarn guides defining at least a first group and a second group;

said yarn guides in each of said groups being movable in unison with each other and independently of said yarn guides in the other of said groups;

pattern drive means for moving said yarn guides in each of said groups independently of said yarn guides in the other of said groups;

said pattern drive means including a control program and servo motors electrically controlled by said control program and mounted independently of said guide bar; and connecting means including tensioned traction control cables interconnecting said servo motors and said yarn guides.

2. A warp knitting machine as in claim 1, and further including spring means for tensioning said cables, said spring means being attached to said cables at a location distal from said servo motors.

3. A warp knitting machine as in claim 1, wherein said traction control cables extend from said servo motors to said yarn guides and, via a deflection, then back to said servo motors, and wherein said servo motors drive said cables in both forward and rearward directions.

4. A warp knitting machine as in claim 3, wherein each of said cables has a first, forward run and a second, return run, said first, forward run being connected to said first group of said yarn guides, and said second, return run being connected to said second group of said yarn guides.

5. A warp knitting machine as in claim 1, and further including a guide bar rocker shaft connected to said guide bar and having a longitudinal axis, and wherein each of said traction control cables extends along a path of travel having a first section generally parallel to said guide bar, and a second section extending toward said pattern drive at approximately a right angle to said first section and substantially intersecting a longitudinal projection of said longitudinal axis of said shaft.

6. A warp knitting machine as in claim 1, and further including deflection means for deflecting said control cables at a location upstream from said servo motors, and a support for said deflection means, said support being movable so as to disengage said traction control cables from said servo motors at desired times.

7. A warp knitting machine as in claim 6, wherein said support includes tensioning means for adjusting the tension of each of said control cables.

8. A warp knitting machine as in claim 1, wherein said connecting means further includes spring rods, and said machine further includes stop means on said guide bar for limiting said reciprocating movement of said yarn guides.

* * * * *

UNITED STATES PATENT AND TRADEMARK OFFICE
CERTIFICATE OF CORRECTION

PATENT NO. : 5,241,842
DATED : September 7, 1993
INVENTOR(S) : Hägel

It is certified that error appears in the above-identified patent and that said Letters Patent is hereby corrected as shown below:

Column 1, line 65, after "machine" insert a period (.).

Column 2, line 13, "wit" should be -- with --.

Column 3, line 58, omit "project," (second occurrence of "project" - end of line.)

Column 3, line 60, after "movement" insert -- of --.

Column 3, line 64, after "to" insert -- a --.

Column 4, line 2, after "function" insert a period (.).

Column 4, line 5, omit "a forward and backward movement".

Signed and Sealed this

Fifth Day of April, 1994

BRUCE LEHMAN

Attest:

Attesting Officer

Commissioner of Patents and Trademarks